United States Patent
Sasaki

(10) Patent No.: US 11,250,804 B2
(45) Date of Patent: Feb. 15, 2022

(54) DISPLAY DRIVER CIRCUIT BOARD AND DISPLAY DEVICE

(71) Applicant: SHARP KABUSHIKI KAISHA, Sakai (JP)

(72) Inventor: Takashi Sasaki, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/069,381

(22) Filed: Oct. 13, 2020

(65) Prior Publication Data

US 2021/0118387 A1    Apr. 22, 2021

Related U.S. Application Data

(60) Provisional application No. 62/924,578, filed on Oct. 22, 2019.

(51) Int. Cl.
*G09G 3/36*         (2006.01)

(52) U.S. Cl.
CPC ................................ *G09G 3/3648* (2013.01)

(58) Field of Classification Search
CPC .......... G09G 3/3648; G09G 2300/0408; G09G 2300/0426; G02F 1/13452; G02F 1/13458
See application file for complete search history.

(56) References Cited

U.S. PATENT DOCUMENTS

2015/0279272 A1* 10/2015 Takahara ............. G09G 3/3266
                                                          345/76
2018/0219176 A1*  8/2018 Kim .................... H01L 27/3244

FOREIGN PATENT DOCUMENTS

JP          2008-033094 A     2/2008

* cited by examiner

*Primary Examiner* — Sahlu Okebato
(74) *Attorney, Agent, or Firm* — ScienBiziP, P.C.

(57) ABSTRACT

A display driver circuit board includes: a substrate connected to a display panel; a display driver mounted on the substrate, and processing an input signal and output an image signal; and a terminal including a plurality of unit terminals arranged in a join, of the substrate, to the display panel, the unit terminals including a unit terminal supplying the image signal to the display panel. The substrate includes: the terminal including a plurality of terminals arranged at intervals in the join; and a no-terminal-formation region provided between the terminals neighboring, and keeping the unit terminals from being formed.

7 Claims, 14 Drawing Sheets

DISPLAY DRIVER CIRCUIT BOARD AND DISPLAY DEVICE

CROSS-REFERENCE TO RELATED APPLICATION

The present application claims priority to U.S. Provisional Application Ser. No. 62/924,578, filed Oct. 22, 2019, the content to which is hereby incorporated by reference into this application.

BACKGROUND OF THE INVENTION

1. Field of the Invention

This specification discloses a technique directed to a display driver circuit board and a display device.

2. Description of the Related Art

Japanese Unexamined Patent Application Publication No. 2008-033094 cites a typical example of display devices known in the art. A display device cited in Japanese Unexamined Patent Application Publication No. 2008-033094 includes: a display panel including a display driver circuit board provided with a drive electrode and having a back face provided with an ejector of a drive electrode line to be electrically connected to the drive electrode, a transparent electrode substrate, and a display unit held between the display driver circuit board and the transparent electrode substrate; and a display driver circuit board mounting substrate including an electrode electrically connected through an electric connector to the ejector, of the drive electrode line, provided to the display driver circuit board.

SUMMARY OF THE INVENTION

In the display device cited in Japanese Unexamined Patent Application Publication No. 2008-033094, the back face of the substrate can be used as a region for connecting to the driver circuit, and, furthermore, a large terminal can be connected. Such a configuration makes it possible to increase connection density. Japanese Unexamined Patent Application Publication No. 2008-033094 adopts, however, a significantly special structure in which the display driver circuit board has a via hole formed therethrough in order to connect the drive electrode on the display driver circuit board to the electrode on the back face of the display driver circuit board. Such a structure inevitably decreases sealability caused by the via hole. In addition, because of this structure, currently working production facilities need to be replaced with new ones. Manufactures of display devices are asked to provide the display devices with higher definition, without adopting such a special structure.

A technique cited in this Specification is devised under the above circumstances, and is intended to provide a display with high definition without adopting a special structure.

(1) A display driver circuit board according to a technique described in the Specification of the present application includes: a substrate connected to a display panel; a display driver mounted on the substrate, and processing an input signal and output an image signal; and a terminal including a plurality of unit terminals arranged in a join, of the substrate, to the display panel, the unit terminals including a unit terminal supplying the image signal to the display panel, wherein the substrate includes: a plurality of the terminals arranged at intervals in the join; and a no-terminal-formation region provided between the terminals neighboring, and keeping the unit terminals from being formed.

(2) In addition to the above item (1), in the display driver circuit board, in the substrate, the join may be divided for each of the terminals.

(3) In addition to the above item (2), in the display driver circuit board, in the substrate, the no-terminal-formation region may be a notch.

(4) In addition to any one of the above items (1) to (3), in the display driver circuit board, in each of the terminals, the unit terminals may include a common potential terminal supplied with a common potential signal, and a plurality of the common potential terminals may be each disposed at an end, of the join of the substrate, along the arrangement of the terminals, and in a portion, of the join of the substrate, bordering the no-terminal-formation region.

(5) In addition to any one of the above items (1) to (4), in the display driver circuit board, the display driver may include a plurality of groups of input terminals receiving the input signal, each of the groups including a pair of the input terminals.

(6) In addition to the above item (5), in the display driver circuit board, where "n" is the number of the unit terminals included in the terminals and receiving the image signal to be output from the display driver, and "m" is a group number counted from a first group of the groups of the input terminals, the first group of the input terminals may be sequentially supplied with a 0th to an (n−1)th input signals included in the input signal, and an m-th group of the input terminals may be sequentially supplied with an n·(m−1)th to an (n·m−1)th input signals included in the input signal.

(7) In addition to any one of the above items (1) to (6), in the display driver circuit board, the display driver may be disposed across the no-terminal-formation region along the arrangement of the terminals.

(8) In addition to any one of the above items (1) to (6), the display driver circuit board may further include as many display drivers, included in the display driver, as the terminals.

(9) A display device according to a technique described in the Specification of the present application includes: the display driver circuit board according to any one of the items (1) to (8); and a display panel to which the display driver circuit board is connected.

A technique cited in this specification can provide a display with high definition without adopting a special structure.

DETAILED DESCRIPTION OF THE INVENTION

First Embodiment

Figure 1:
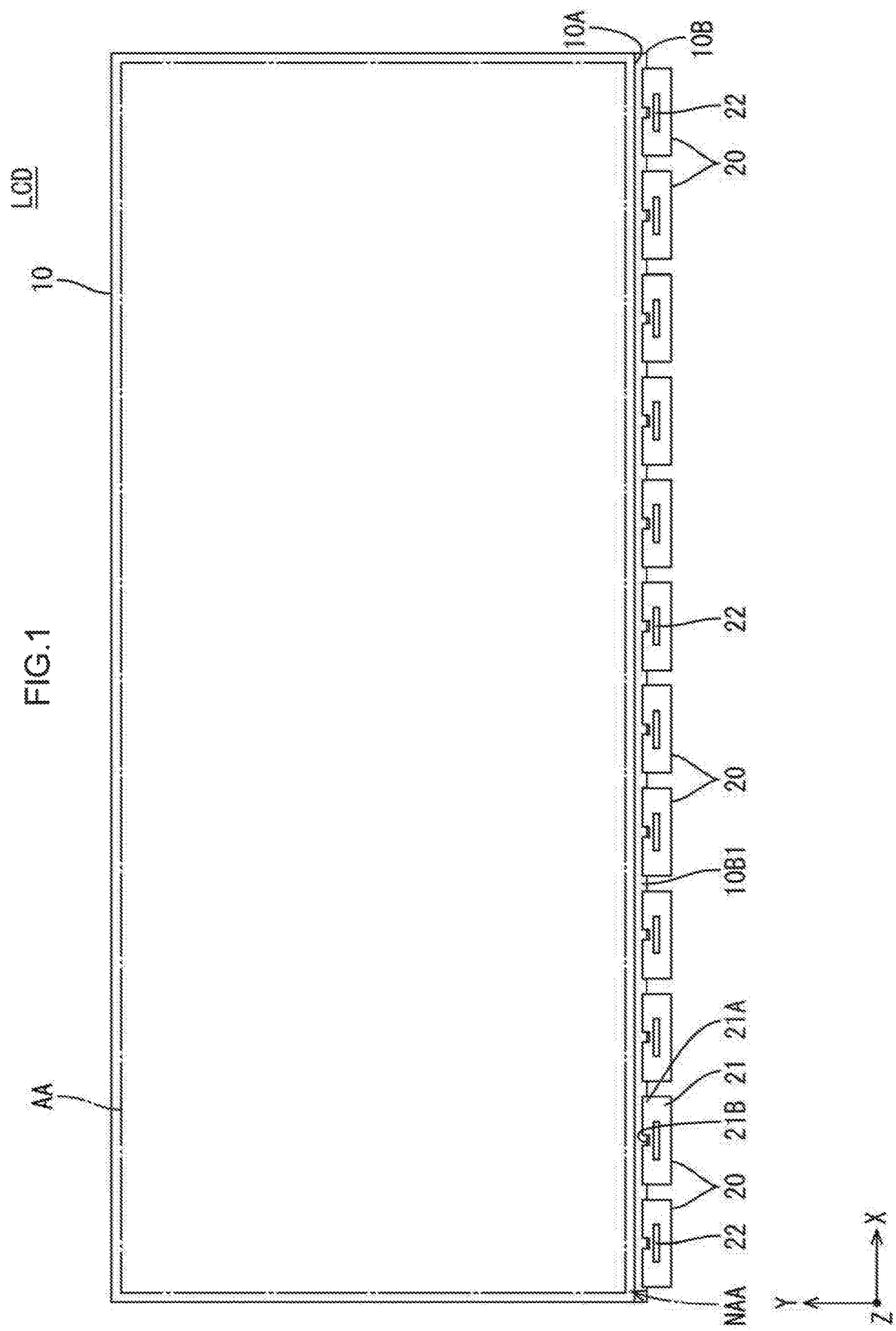
FIG. 1 is a plan view illustrating a display driver circuit board, according to a first embodiment, connected to a liquid crystal panel.

A first embodiment is described, with reference to FIGS. 1 to 5. Described as an example in this embodiment is a display driver circuit board 20 connected to a liquid crystal panel (a display panel) 10. Note that a part of each drawing includes an illustration of an X-axis, a Y-axis, and a Z-axis, so that the directions of the axes correspond to directions indicated in the drawing.

The liquid crystal panel 10 displays an image, using light to be emitted from a backlight device (a lighting device). Together with the back light device, the liquid crystal panel 10 constitutes a liquid crystal display device (a display device) LCD. The liquid crystal panel 10 illustrated in FIG. 1 is shaped into a rectangle in horizontal orientation. In the liquid crystal panel 10, the center of the screen is a display area (an active area) AA capable of displaying an image; whereas, the outer edge of the screen is a non-display area (a non-active area) NAA shaped into a frame (a photoframe) in planner view to surround the display area AA, and displaying no image. The liquid crystal panel 10 according to this embodiment is assumed to have a screen size of, for example, approximately 32 inches and a resolution of approximately "7,680×4,320 pixels" equivalent to an 8K resolution. In the liquid crystal panel 10 whose screen size is approximately 32 inches, the display area AA has a long side dimension of approximately 700 mm and a short side dimension of approximately 400 mm. In this embodiment, the long-side direction of the liquid crystal panel 10 corresponds to the X-axis direction of each drawing, the short-side direction to the Y-axis direction, and a thickness-direction to the Z-axis direction. Note that, in FIG. 1, the display area AA is surrounded by a dot-and-dash line.

The liquid crystal panel 10 includes: a pair of substrates 10A and 10B made of substantially transparent (light-transparent) glass; and a liquid crystal layer held between the substrates 10A and 10B. The liquid crystal layer contains liquid crystal molecules, that is, a substance whose optical property changes when a voltage is applied. Of the pair of substrates 10A and 10B, the substrate 10A on the front face (in the front) is a CF substrate (a counter substrate) 10A, and the substrate 10B on the rear face (in the back) is an array substrate (an active matrix substrate) 10B. The CF substrate 10A, which has a short side dimension shorter than that of the array substrate 10B, is attached to the array substrate 10B such that Y-axis-ends of the short sides of the CF substrate 10A (upper ends of the short sides of the CF substrate 10A in FIG. 1) coincide with Y-axis-ends of the short sides of the array substrate 10B. Hence, the other Y-axis-ends of the short sides of the array substrate 10B (lower ends of the short sides of the array substrate 10B) do not overlap with the CF substrate 10A. The other ends are referred to as a CF substrate non-overlapping portion 10B1. The CF substrate non-overlapping portion 10B1 is a strip of region extending along the X-axis. Mounted on this CF substrate non-overlapping portion 10B1 is an end of a display driver circuit board 20 for transmitting various signals to the liquid crystal panel 10. The display driver circuit board 20 will be described later in detail.

Figure 2:
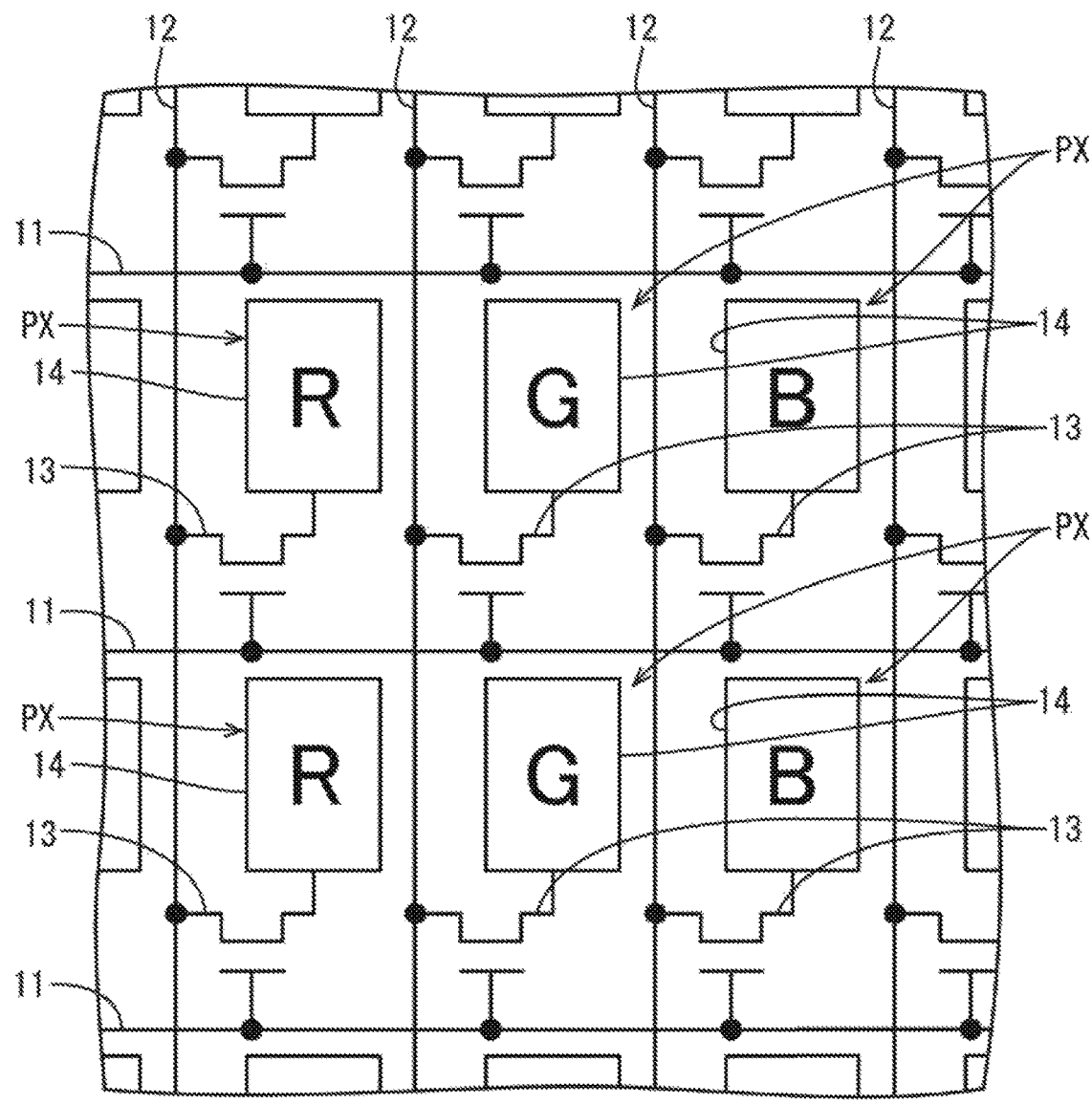
FIG. 2 is a circuit diagram illustrating pixels arranged in a display area of an array substrate included in the liquid crystal panel.

As illustrated in FIG. 2, the array substrate 10B has an interior face, in the display area AA, provided with: a plurality of gate lines (scanning lines) 11 and a plurality of source lines (signal lines, data lines) 12 arranged in a matrix; and TFTs 13 acting as switching elements and pixel electrodes 14 each provided to a corresponding one of intersections between the gate lines 11 and the source lines 12. The gate lines 11 extend along the X-axis across the display area AA and connect to gate electrodes of the TFTs 13; whereas, the source lines 12 extend along the Y-axis across the display area AA and connect to source electrodes of the TFTs 13. The gate lines 11 are spaced apart from each other and arranged along the Y-axis; whereas, the source lines 12 are spaced apart from each other and arranged along the X-axis. The TFTs 13 and the pixel electrodes 14 are arranged planarly along the X-axis and the Y-axis in a matrix. Each of the TFTs 13 has a drain electrode connected to a corresponding one of the pixel electrodes 14. The TFTs 13 are driven in accordance with a scanning signal to be supplied to the gate lines 11. When the TFTs 13 are driven, the pixel electrodes 14 are charged with a potential in accordance with an image signal to be supplied to the source lines 12.

In contrast, as illustrated in FIG. 2, the CF substrate 10A has an interior face, in the display area AA, provided with: color filters in three colors of red (R), green (G), and blue (B) each arranged to overlap a corresponding one of the pixel electrodes 14; and light shields (black matrices) each dividing neighboring color filters. Note that, in FIG. 2, an alphabet (R, G, B) is assigned to each of the pixel electrodes 14 to represent a color of a color filter overlapping the corresponding pixel electrode 14. In this liquid crystal panel 10, color filters R, G, B arranged along the X-axis and three pixel electrodes 14 each facing a corresponding one of the color filters R, G, B constitute pixels PX in respective three colors. Then, in this liquid crystal panel 10, the pixels PX arranged side-by-side along the X-axis and provided with respective three colors R, G, B, constitute a display pixel capable of providing colors in a predetermined grayscale. Each of the plurality of the pixels PX are arranged along the X-axis and the Y-axis in a matrix. The liquid crystal panel 10 according to this embodiment has approximately an 8K resolution. Hence, "7,680" display pixels and "23,040" pixels PX (the source lines 12) are arranged along the X-axis. Moreover, "4,320" display pixels and pixels PX (the gate lines 11) are arranged along the Y-axis. Furthermore, either the CF substrate 10A or the array substrate 10B is provided with a common electrode made of a transparent electrode material similar to that of the pixel electrode 14, and disposed to be spaced apart from, and overlap, the pixel electrode 14. The common electrode is maintained to have a common potential (a reference potential). In the liquid crystal panel 10, a predetermined electric field is applied to the liquid crystal layer in accordance with a potential difference that occurs between this common electrode and the corresponding pixel electrode 14. Such a feature makes it possible to cause each pixel PX to provide a predetermined grayscale.

The display driver circuit board 20 will be described in detail. As illustrated in FIG. 1, the display driver circuit board 20 includes display driver circuit boards 20 linearly arranged along the X-axis and mounted on the CF substrate non-overlapping portion 10B1. In this embodiment, "12" display driver circuit boards 20 are mounted (arranged) on the liquid crystal panel 10. For the sake of mounting, the neighboring display driver circuit boards 20 are arranged at predetermined intervals (e.g., approximately 3 mm intervals). Each of the display driver circuit boards 20 includes a substrate 21 made of a synthetic resin material (e.g., polyimide-based resin) and shaped into a flexible film sheet. In planner view, the substrate 21 is shaped into a substantial rectangle in horizontal orientation. On a surface of the substrate 21, a source driver (a display driver) 22 is mounted and many wires are patterned and routed. In this embodiment, "one" source driver 22 is mounted on the substrate 21. The source driver 22 is mounted on the substrate 21 in the form of a chip-on-film (COF) package. The source driver 22 is an LSI chip containing a driver circuit, and capable of processing an input signal and outputting an image signal. The input signal to be input into the source driver 22 is supplied from a signal supply source (e.g., a control substrate) connected to an end of the display driver circuit board 20. The image signal output from the source driver 22 is supplied to the liquid crystal panel 10 to which another end of the display driver circuit board 20 is connected. In the liquid crystal panel 10, the image signal is supplied to the source lines 12 (see FIG. 2).

In the liquid crystal panel 10, as illustrated in FIG. 1, each of the source drivers 22 mounted on a corresponding one of the display driver circuit boards 20 arranged along the X-axis supplies image signals in a strip area, of the display area AA of the liquid crystal panel 10, with a predetermined width along the X-axis. Specifically, the long side dimension of the display area AA is divided by the number of the source drivers 22 installed, and a dimension is obtained. The obtained dimension is the width dimension of the strip area assigned to one source driver 22. Each source driver 22 is assigned to the strip area to supply the strip area with image signals. In this embodiment, "23,040" pixels PX (the source lines 12) are arranged along the X-axis in the liquid crystal panel 10. Hence, one source driver 22 is required to output "1,920" image signals. This is the number of output channels assigned to each of the source drivers 22. Other than the input signal to be input to the source driver 22 and the image signal to be output from the source driver 22, a wiring pattern of the substrate 21 is capable of transmitting various signals (including, for example, a gate start pulse signal, a clock signal, a reset signal that are hereinafter referred to as a "gate signal") related to a scanning signal to be supplied to the gate lines 11, a common potential signal to be supplied to the common electrode, and a power supply voltage. The gate signal, the common potential signal, and the power supply voltage are supplied from the signal supply source to the display driver circuit board 20; however, these signals are supplied to the liquid crystal panel 10 not through the source driver 22. Note that, mounted on the liquid crystal panel 10 is a gate driver to process the gate signal and output the scanning signal. A similar function is provided to a gate driver monolithic (GDM) circuit monolithically included in the liquid crystal panel 10.

Figure 3:
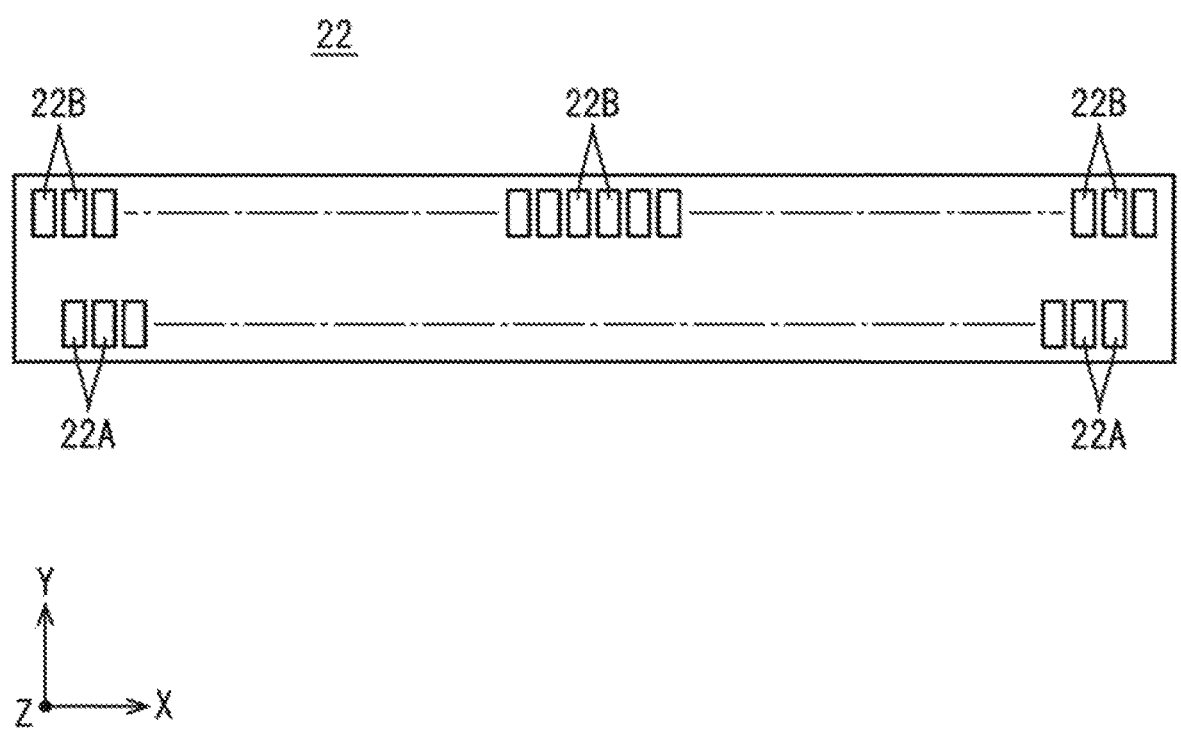
FIG. 3 is a bottom view of a source driver included in the display driver circuit board.

The source driver 22 has an opposing face to the substrate 21. As illustrated in FIG. 3, the opposing face is provided with a plurality of input terminals 22A and a plurality of output terminals 22B. The input terminals 22A are supplied with such a signal as an input signal transmitted through the wiring pattern of the substrate 21; whereas, the output terminals 22B are supplied with an image signal to be output from the source driver 22. Each pair of the input terminals 22A constitutes a group to be supplied with input signals to be processed by the source driver 22. Each pair of the input terminals 22A constituting a group is supplied with input signals for image signals to be supplied to "640" display pixels arranged along the X-axis, that is, to be supplied to source lines 12 connected to "1,920" pixels PX arranged along the X-axis. Distribution (data mapping) of the input signals among the source drivers 22 is specifically described as follows: The source driver 22, which is in the display driver circuit board 20 positioned on the far left in FIG. 1, includes pairs of input terminals 22A sequentially supplied with the 0th to the 1,919th input signals. The source driver 22, which is in the display driver circuit board 20 positioned second from the left in FIG. 1, includes pairs of input terminals 22A sequentially supplied with the 1,920th to the 3,839th input signals. The source driver 22, which is in the display driver circuit board 20 positioned twelfth from the far left, that is, positioned on the far right in FIG. 1, includes pairs of input terminals 22A sequentially supplied with the 21,120th to the 23,039th input signals. That is, the pairs of the input terminals 22A included in the source driver 22 of a display driver circuit board 20 are sequentially supplied with the "Y·(X−1)th" to the "X·(Y−1)th" input signals, where "X" is what number the display driver circuit board 20 is from the far left in FIG. 1, and "Y" is the number of output channels of the source driver 22. Moreover, there are as many output terminals 22B installed as the output channels of each source driver 22.

Figure 4:
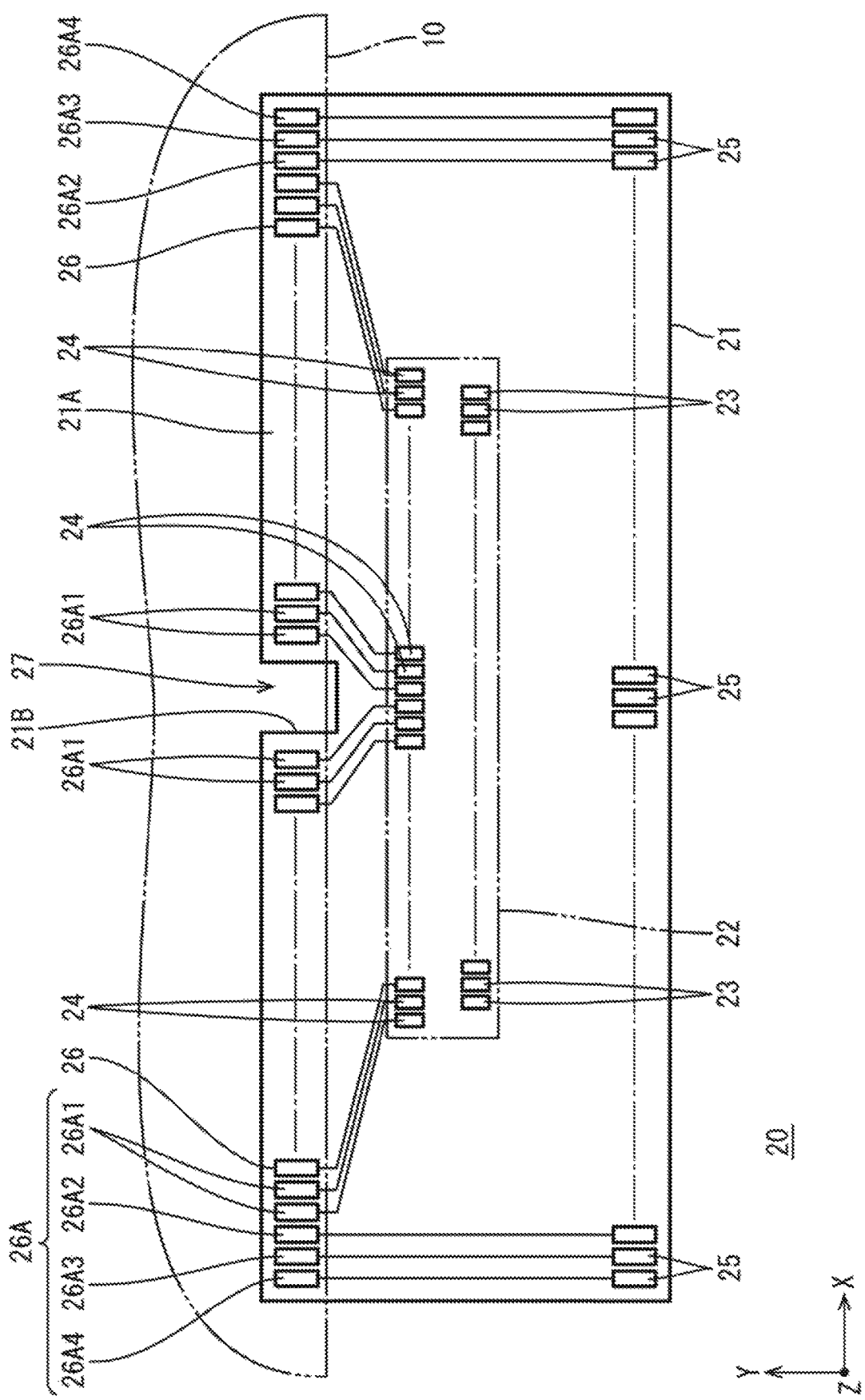
FIG. 4 is a plan view of the display driver circuit board.

Meanwhile, as illustrated in FIG. 4, a mounting region of the source driver 22 on the substrate 21 is provided with a plurality of driver input terminals 23 and a plurality of driver output terminals 24 respectively connected to the input terminals 22A and the output terminals 22B through, for example, anisotropic conductive film. The driver input terminals 23 are positioned along the X-axis and offset away from the liquid crystal panel 10 in relation to a group of the driver output terminals 24 of the substrate 21. As many driver input terminals 23 as the input terminals 22A of the source driver 22 are arranged at intervals along the X-axis. The driver output terminals 24 are positioned along the X-axis and offset toward the liquid crystal panel 10 in relation to a group of the driver input terminals 23 of the substrate 21. As many driver output terminals 24 as the output terminals 22B of the source driver 22 are arranged at intervals along the X-axis. Connected to the driver input terminals 23 and the driver output terminals 24 is wiring patterned and routed on the substrate 21. Moreover, a plurality of signal supply source terminals 25 are provided to a join, on the substrate 21, to be connected to the signal supply source. The signal supply source terminals 25 are arranged at intervals along the X-axis.

Figure 5:
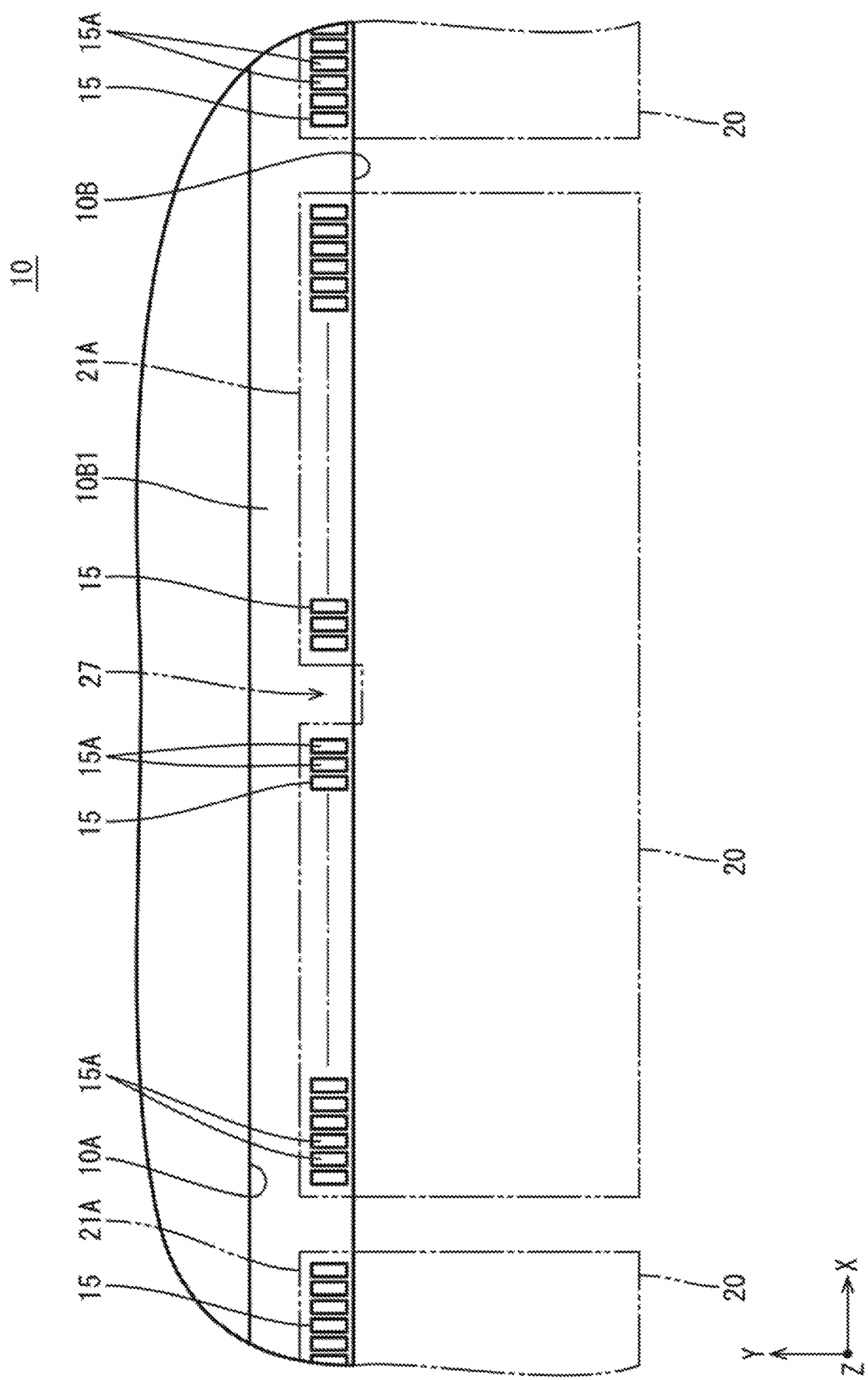
FIG. 5 is a plan view of a join of the display driver circuit board in the liquid crystal panel.

As illustrated in FIG. 5, the CF substrate non-overlapping portion 10B1 of the array substrate 10B included in the liquid crystal panel 10 is provided with a panel terminal 15 including a plurality of panel unit terminals 15A. The panel terminal 15 is disposed to a join, of the CF substrate non-overlapping portion 10B1, to a display driver circuit board 20. The panel terminal 15 includes a plurality of panel terminals 15 arranged along the X-axis at predetermined intervals (approximately 3 mm). The number of the panel terminals 15 arranged is twice as many as the number of the display driver circuit boards 20 to be mounted (24 display driver circuit boards 20). Each of the panel terminals 15 has an X-axis dimension obtained as follows: The long-side dimension (approximately 700 mm) of the display area AA is divided by the number (24) of the panel terminals 15, and a value is obtained (approximately 29 mm). From the obtained value, an interval between neighboring panel terminals 15 is subtracted, and a value obtained (approximately 26 mm) is the X-axis dimension of each panel terminal 15. The panel unit terminals 15A included in the panel terminals 15 are linearly arranged at intervals along the X-axis. An interval between neighboring panel unit terminals 15A is significantly shorter (the order of micrometers) than that between neighboring panel terminals 15. Each of the panel unit terminals 15A receives such signals as the image signal, the gate signal, the common potential signal, and the power source voltage supplied from the display driver circuit board 20. Of the panel unit terminals 15A, "960" panel unit terminals 15A, that is, a half as many as the number of the output channels of the source driver 22, receive image signals.

In contrast, the substrate 21 in the display driver circuit board 20 includes a join 21A to be connected to the liquid crystal panel 10. As illustrated in FIG. 4, arranged in the join 21A is a terminal 26 including a plurality of unit terminals 26A. The terminal 26 has an X-axis dimension as long as the X-axis dimension of the panel terminal 15 (approximately 26 mm). The unit terminals 26A included in the terminal 26 are linearly arranged at intervals along the X-axis. An interval between neighboring unit terminals 26A is significantly shorter (the order of micrometers) than that between neighboring terminals 26. Each of the unit terminals 26A is connected through anisotropic conductive film to a corresponding one of the panel unit terminals 15A included in the above panel terminals 15. The unit terminals 26A include at least: an image signal terminal 26A1 supplied with the image signal; a common potential terminal 26A2 supplied with the common potential; a gate signal terminal 26A3 supplied with the gate signal; and a power source voltage terminal 26A4 supplied with the power source voltage. As many as "960" image signal terminals 26A1 are included in the terminal 26, that is, the number of the image signal terminals 26A1 is half as many as the number of the output channels of the source driver 22. The image signal terminals 26A1 are arranged side-by-side in the center of the join 21A along the X-axis. Moreover, the common potential terminal 26A2, the gate signal terminal 26A3, and the power supply voltage terminal 26A4 are provided to each of opposing ends 21A1 of the join 21A along the X-axis.

As illustrated in FIG. 4, the terminal 26 includes two terminals 26. In the join 21A of the substrate 21, the two terminals 26 are arranged at an interval along X-axis. The interval between the two terminals 26 is approximately the same as the intervals between the neighboring panel terminals 15 (approximately 3 mm), and also is approximately the same as the intervals between the neighboring display driver circuit boards 20 (approximately 3 mm). Then, the join 21A of the substrate 21 includes a no-terminal-formation region 27 provided between the neighboring terminals 26, and keeping the unit terminal 26A from being formed. The no-terminal-formation region 27 has an X-axis dimension (a dimension in which the terminals 26 are arranged) matching the interval between the neighboring terminals 26. The X-axis dimension is significantly larger than the intervals between the neighboring unit terminals 26A. The substrate 21 has an X-axis dimension obtained as follows: The X-axis dimension of the terminal 26 (approximately 26 mm) is multiplied by "2" that is the number of terminals 26, and a value is obtained. The obtained value is added to the X-axis dimension of the no-terminal-formation region 27 (approximately 3 mm), and a value is obtained (approximately 55 mm). The obtained value is the X-axis dimension of the substrate. 21.

Here, typically, each of the display driver circuit boards is connected to a corresponding one of the panel terminals 15 of the liquid crystal panel 10. Hence, each display driver circuit board is provided with one terminal. In this case, the number of the display driver circuit boards is "24" that is the same as the number of the panel terminals 15. Furthermore, the number of the output channels of the source driver to be mounted on the display driver circuit board is "960." Hence, the largest X-axis dimension acceptable of the display driver circuit board is obtained as follows: The long side dimension of the display area AA (approximately 700 mm) is divided by the number of the display driver circuit boards (24), and a value is obtained (approximately 29 mm). From the obtained value, an interval (approximately 3 mm) between the neighboring display driver circuit boards is subtracted, and a value is obtained (approximately 26 mm). The obtained value is the largest X-axis dimension acceptable. When wiring is patterned on the display driver circuit board having such a dimension with the source driver mounted thereon, the number of the output channels is excessively large. Hence, it is difficult to design all the wiring patterns to be fitted in the substrate in view of arrangement space.

In this regard, as illustrated in FIG. 4, the join 21A, to the liquid crystal panel 10, in the substrate 21 of the display driver circuit board 20 includes the no-terminal-formation region 27 between the two terminals 26 arranged at an interval. Such a feature allows one display driver circuit board 20 to be connected to a portion of the liquid crystal panel 10 instead of two display driver circuit boards as typically connected, and furthermore, two panel terminals 15 to be connected to two terminals 26 in the liquid crystal panel 10 can be left as they are. Hence, the X-axis dimension of the substrate 21 is obtained as follows: A value twice as large as the X-axis dimension of a typical display driver circuit board (approximately 26 mm) is added to an interval (approximately 3 mm) between typical two neighboring display driver circuit boards, and a value is obtained (approximately 55 mm). The obtained value is the X-axis dimension of the substrate 21. Such a feature makes it possible to leave a large space for wiring to be patterned on the substrate 21 by the interval (approximately 3 mm) left between the neighboring typical display driver circuit boards, beneficially achieving high definition. Moreover, the feature eliminates the need for changing the design of the panel terminals 15 acting as joins, of the liquid crystal panel 10, to the terminals 26.

Then, the substrate 21 illustrated in FIG. 4 is bifurcated so that the join 21A to the liquid crystal panel 10 is divided for each of the terminals 26. The join 21A of the substrate 21 includes a notch 21B formed between the two terminals 26. That is, the no-terminal-formation region 27 is the notch 21B. The notch 21B, which is shaped into a square in planner view, has an X-axis dimension matching an interval between the neighboring terminals 26, that is, an X-axis dimension of the no-terminal-formation region 27. This means that the entire no-terminal-formation region 27 is the notch 21B. Here, when connected to the liquid crystal panel 10, the join 21A of the substrate 21 is heated and pressed with anisotropic conductive film provided between the join 21A and the liquid crystal panel 10. Hence, the join 21A of the substrate 21 thermally expands, and the thermal expansion might cause misalignment along the X-axis between the unit terminals 26A of the terminals 26 and the panel unit terminals 15A of the panel terminals 15. In this case, too, the join 21A of the substrate 21 to the liquid crystal panel 10 is divided for each of the terminals 26. Even if the unit terminals 26A are misaligned along the X-axis because of the thermal expansion of the join 21A, the misalignment is not significant. Specifically, when the substrate 21 has a thermal expansion rate of, for example, 0.3%, an amount of misalignment to be assumed if the join is not divided is approximately 16.5 µm; whereas, the amount of misalignment to be assumed of the join 21A in a divided structure halves to be approximately 7.8 µm. Such a feature reduces the risk of poor electrical connection. Moreover, the no-terminal-formation region 27 is formed of the notch 21B, such that, using an edge of the notch 21B of the join 21A, the join 21A is easily positioned with respect to the liquid crystal panel 10. Such a feature makes it possible to easily connect the substrate 21 to the liquid crystal panel 10. Moreover, compared with a case where the join of the substrate is divided by a slit, the notch 21B provides a clearance between the divided portions of the join 21A, reducing interference between the divided portions and further facilitating joining work.

As illustrated in FIG. 4, the source driver 22 mounted on the substrate 21 structured above is disposed along the X-axis across the no-terminal-formation region 27. Specifically, the source driver 22 is shaped into a rectangle in horizontal orientation along the X-axis, and disposed with the center line substantially aligned along the X-axis with that of the substrate 21. Here, if two source driver each having 960 output channels are mounted on the substrate, the two source drivers have to be spaced apart from each other at a predetermined interval for the sake of mounting. In contrast, one source driver 22 having 1,920 output channels is disposed along the X-axis across the no-terminal-formation region 27. Such a feature makes it possible to leave a large space along the X-axis for wiring to be patterned on both sides of the source driver 22 in the substrate 21. Hence, the feature achieves high definition more beneficially.

As can be seen, the display driver circuit board 20 of this embodiment includes: the substrate 21 connected to the liquid crystal panel (a display panel) 10; the source driver (a display driver) 22 mounted on the substrate 21, and processing an input signal and outputting an image signal; and the terminal 26 including the unit terminals 26A arranged in the join 21A, of the substrate 21, to the liquid crystal panel 10, the unit terminals 26A including a unit terminal 26A supplying the image signal to the liquid crystal panel 10, wherein, the substrate 21 includes: the terminal 26 including the terminals 26 arranged at intervals in the join 21A; and the no-terminal-formation region 27 provided between the terminals 26 neighboring and keeping the unit terminals 26A from being formed.

According to such features, the source driver 22 processes the input signal and outputs the processed input signal as the image signal. The image signal is supplied through the terminal 26 including the unit terminals 26A disposed in the join 21A, of the substrate 21, to the liquid crystal panel 10. The image signal displays an image on the liquid crystal panel 10.

A typical display device has a special structure in which the display driver circuit board includes a via hole formed therethrough to achieve high definition. In order to avoid such a special structure, adopted is a common structure in which a plurality of display driver circuit boards are arranged with respect to the liquid crystal panel 10. In such a case, for the sake of mounting, the neighboring display driver circuit boards are spaced apart from each other at predetermined intervals or greater. Hence, if more display driver circuit boards are connected to achieve higher definition, each display driver circuit board is likely to be smaller in acceptable external dimensions in relation to the external dimensions of the liquid crystal panel 10. The smaller external dimensions make it difficult to leave a space in the substrate 21 for providing, for example, wiring.

In contrast, the join 21A, of the substrate 21, to the liquid crystal panel 10 includes the terminals 26 including the unit terminals 26A and arranged at intervals. In addition, provided between the terminals 26 is the no-terminal-formation region 27 keeping the unit terminals 26A from being formed. Such features allows one display driver circuit board 20 to be connected to a portion of the liquid crystal panel 10 instead of two or more display driver circuit boards as typically connected, and, furthermore, the configuration of the portion, of the liquid crystal panel 10, to be connected to the terminals 26 can be left as it is. The features make it possible to leave a large space for wiring to be disposed on the substrate 21 by the interval left between the neighboring typical display driver circuit boards, beneficially achieving high definition. Hence, the display device of the present disclosure can achieve high definition with neither adopting a special structure as typically seen, nor changing the design of the join, of the liquid crystal panel, to the terminal 26.

Moreover, in the substrate 21, the join 21A is divided for each of the terminals 26. When the substrate 21 is connected to the liquid crystal panel 10, the join 21A to the liquid crystal panel 10 is typically heated. Because of this heating, the join 21A thermally expands. In this case, too, the join 21A of the substrate 21 to the liquid crystal panel 10 is divided for each of the terminals 26. Even if the unit terminals 26A are misaligned because of the thermal expansion of the join 21A, the misalignment is not significant. Such a feature reduces the risk of poor electrical connection.

Moreover, in the substrate 21, the no-terminal-formation region 27 is the notch 21B. Using an edge of the notch 21B, the join 21A of the substrate 21 is easily positioned with respect to the liquid crystal panel 10. Such a feature makes it possible to easily connect the substrate 21 to the liquid crystal panel 10.

Furthermore, the source driver 22 is disposed across the no-terminal-formation region 27 along the arrangement of the terminals 26. Compared with a case where source drivers are arranged at intervals, the disposition of the source driver 22 makes it possible to leave a large space for wiring to be disposed on both sides of the source driver 22 in the substrate 21 along the arrangement of the terminals 26. Hence, the feature achieves high definition more beneficially.

In addition, the liquid crystal display device (the display device) LCD according to this embodiment includes, as described above, the display driver circuit board 20 and the liquid crystal panel (a display panel) 10 to which the display driver circuit board 20 is connected. The liquid crystal display device LCD including such a feature is beneficial in achieving high definition of the liquid crystal panel 10 to which the display driver circuit board 20 is connected.

Second Embodiment

A second embodiment will be described, with reference to FIGS. 6 to 8. This second embodiment describes changes in, for example, arrangement of common potential terminals 126A2. Note that identical or substantially identical structures and advantageous effects between the first embodiment and this embodiment will not be elaborated upon.

Figure 6:
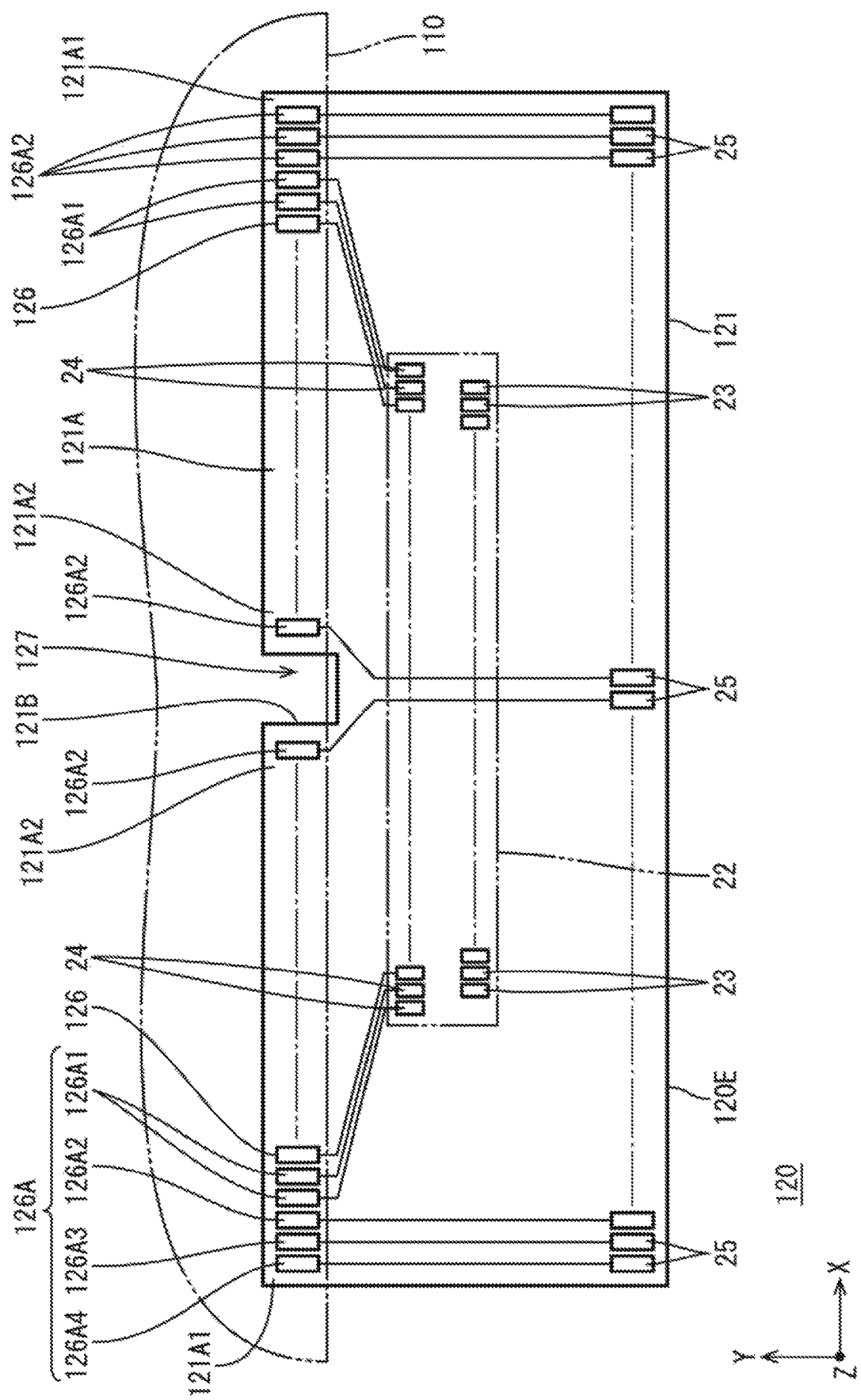
FIG. 6 is a plan view of a display driver circuit board, according to a second embodiment, positioned on the far left of a liquid crystal panel.
Figure 7:
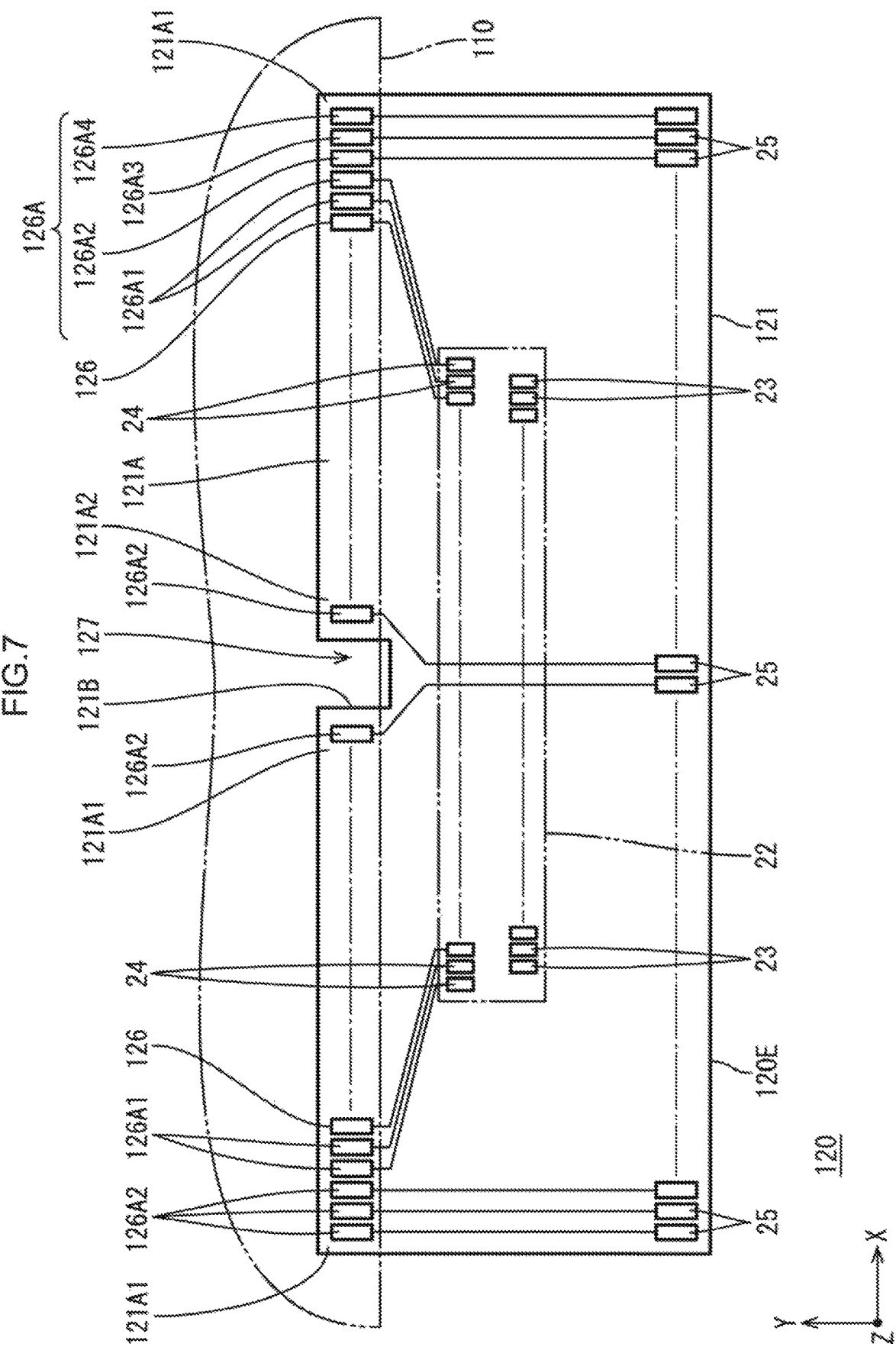
FIG. 7 is a plan view of a display driver circuit board positioned on the far right of the liquid crystal panel.
Figure 8:
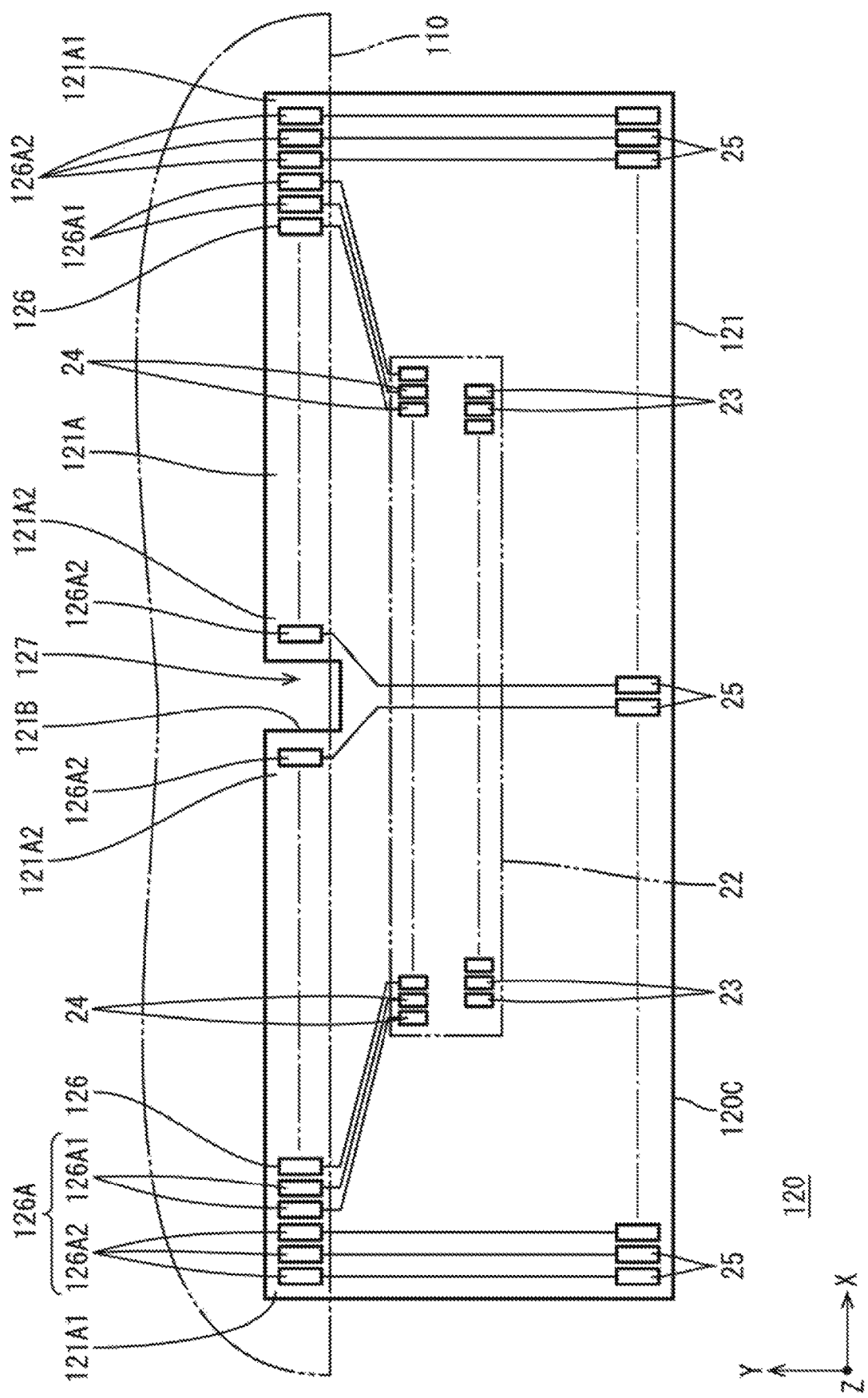
FIG. 8 is a plan view of a display driver circuit board positioned toward the center of the liquid crystal panel.

As illustrated in FIGS. 6 to 8, terminals 126 according to this embodiment are different in arrangement of unit terminals 126A, depending on a display driver circuit board 120 to be installed. FIG. 6 is a plan view of a display driver circuit board 120E positioned on the far left of the liquid crystal panel 10 illustrated in FIG. 1. FIG. 7 is a plan view of a display driver circuit board 120E positioned on the far right of the liquid crystal panel 10 illustrated in FIG. 1. FIG. 8 is a plan view of a display driver circuit board 120C positioned in the center other than the far left and the far right of the liquid crystal panel 10 illustrated in FIG. 1. Note that, in order to distinguish between display driver circuit boards 120, a display driver circuit board positioned at an either end of the liquid crystal panel 10 illustrated in FIG. 1 is denoted with a reference sign having a suffix "E", and a display driver circuit board positioned in the center other than either end of the liquid crystal panel 10 is denoted with a reference sign having a suffix "C." In order to collectively refer to the display driver circuit boards 120, no suffix is added to the reference sign.

FIG. 6 shows the display driver circuit board 120E positioned on the far left of the liquid crystal panel 10 illustrated in FIG. 1. Specifically, as illustrated in FIG. 6, a unit terminal 126A in a terminal 126 includes a gate signal terminal 126A3 and a power source voltage terminal 126A4 arranged side by side at one of opposing ends 121A1, on the left in FIG. 6, of a join 121A of the substrate 121, that is, the opposing end 121A1 positioned closer to an end of the liquid crystal panel 110. In contrast, a common potential terminal 126A2 is disposed at one of the opposing ends 121A1, on the far right in FIG. 6, of the join 121A of the substrate 121, that is, the opposing end 121A1 closer to the center of the liquid crystal panel 110. In addition, a common potential terminal 126A2 is also disposed in a portion 121A2 bordering a no-terminal-formation region 127 (a notch 121B) of the join 121A. Meanwhile, FIG. 7 shows a display driver circuit board 120E positioned on the far right of the liquid crystal panel 10 illustrated in FIG. 1. As illustrated in FIG. 7, a unit terminal 126A in a terminal 126 includes a gate signal terminal 126A3 and a power source voltage terminal 126A4 arranged side by side at one of opposing ends 121A1, on the far right in FIG. 7, of a join 121A of the substrate 121, that is, the opposing end 121A1 positioned closer to an end of the liquid crystal panel 110. In contrast, a common potential terminal 126A2 is disposed at one of the opposing ends 121A1, on the far left in FIG. 7, of the join 121A of the substrate 121, that is, the opposing end 121A1 closer to the center of the liquid crystal panel 110. In addition, a common potential terminal 126A2 is also disposed in a portion 121A2 bordering a no-terminal-formation region 127 (a notch 121B) of the join 121A. As can be seen, in the display driver circuit board 120E, the common potential terminal 126A2 of the terminal 126, which is disposed closer to an end of the liquid crystal panel 110 with respect to the no-terminal-formation region 127, is disposed only at an end closer to the no-terminal-formation region 127; whereas, the common potential terminal 126A2 of the terminal 126, which is disposed closer to the center of the liquid crystal panel 110 with respect to the no-terminal-formation region 127, is disposed at each end along the X-axis. That is, in the display driver circuit board 120E, the common potential terminals 126A2 are distributed among three positions spaced apart from each other along the X-axis in the join 121A of the substrate 121.

Then, FIG. 8 shows the display driver circuit board 120C positioned closer to the center, other than the far left and the far right, of the liquid crystal panel 110 illustrated in FIG. 1.

As illustrated in FIG. 7, a unit terminal 126A in the terminal 126 does not include either the gate signal terminal 126A3 or the power source voltage terminal 126A4. That is, in the display driver circuit board 120C, the unit terminal 126A includes the image signal terminal 126A1 and the common potential terminal 126A2. The common potential terminal 126A2 is disposed at each of opposing ends 121A1 of a join 121A of a substrate 121. In addition, the common potential terminal 126A2 is also disposed in a portion 121A2 bordering a no-terminal-formation region 127 (a notch 121B) of the join 121A. Hence, in the display driver circuit board 120C, the common potential terminals 126A2 are each disposed along the X-axis at an either end of the two terminals 126 arranged to sandwich the no-terminal-formation region 127. In other words, the common potential terminals 126A2 are distributed among four positions spaced apart from each other along the X-axis in the join 121A of the substrate 121.

Here, in the configuration described in the first embodiment, the common potential terminals 26A2 are arranged only at the opposing ends 21A1 of the join 21A, that is, only in two positions spaced apart from each other along the X-axis. (See FIG. 4.) Compared with such a configuration, the display driver circuit boards 120, in FIGS. 6 to 8, according to this embodiment each have the common potential terminals 126A2 distributed among three or four positions spaced apart from each other along the X-axis. That is, the common potential terminals in this embodiment are distributed among more positions than those in the first embodiment. Hence, the liquid crystal panel 110 to be connected to the substrate 121 can be supplied with the common potential signals in more positions along the X-axis. Such a feature causes less imbalance in distribution of resistance in common potentials inside the face of the liquid crystal panel 110, and making it possible to beneficially obtain excellent display quality.

As can be seen, according to this embodiment, the terminals 126 include the common potential terminals 126A2 supplying a common potential signal to the unit terminals 126A. The common potential terminals 126A2 are each disposed at the ends 121A1 and in the portions 121A2 included in the join 121A of the substrate 121. The ends 121A1 are along the arrangement of the terminals 126, and the portions 121A2 boarder the no-terminal-formation region 127. Such a feature allows a common potential signal to be supplied to the liquid crystal panel 110 through the common potential terminals 126A2 included in the unit terminals 126A. Here, compared with a typical substrate, the substrate 121 is larger along the arrangement of the terminals 126. However, the common potential terminals 126A2 are disposed at the ends 121A1 along the above arrangement and in the portions 121A2 bordering the no-terminal-formation region 127 of the join 121A in the substrate 121. Compared with the case where the common potential terminals 126A2 are arranged only at the ends 121A1 along the arrangement, the liquid crystal panel 110 to be connected to the substrate 121 receives common potential signals in more positions along the arrangement. Such a feature causes less imbalance in distribution of resistance in common potentials inside the face of the liquid crystal panel 110, and making it possible to beneficially obtain excellent display quality.

Third Embodiment

A third embodiment will be described, with reference to FIGS. 9 to 11. This third embodiment describes a change from the first embodiment in distribution (data mapping) of signals to be input into a source driver 222. Note that identical or substantially identical structures and advantageous effects between the first embodiment and this embodiment will not be elaborated upon.

Figure 9:
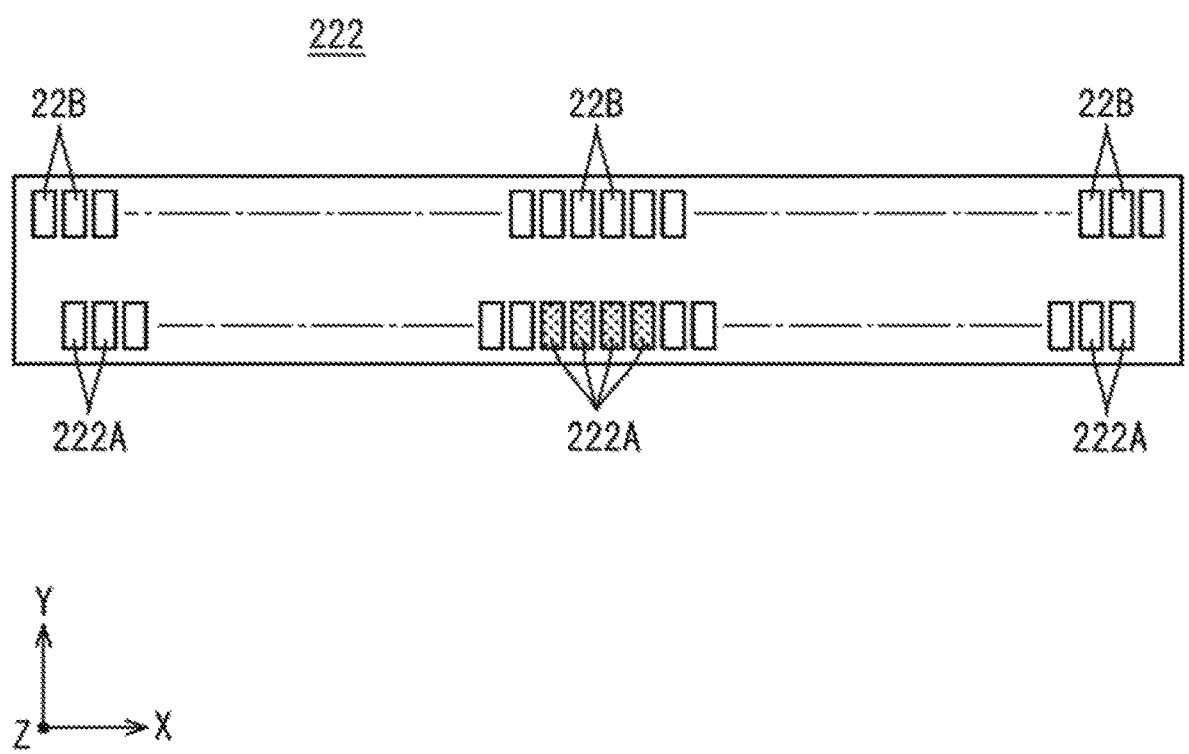
FIG. 9 is a bottom view of a source driver included in a display driver circuit board according to a third embodiment.
Figure 10:
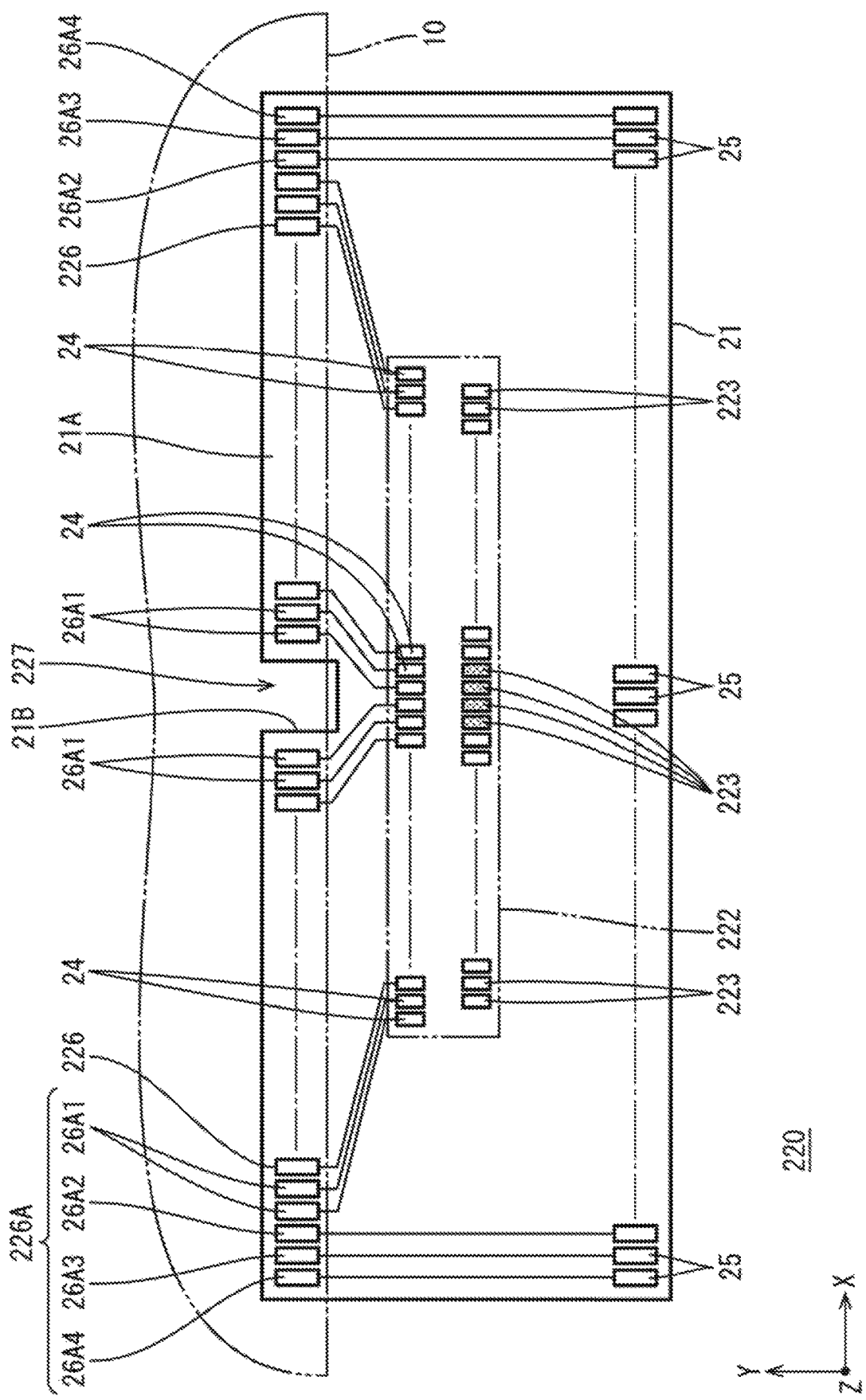
FIG. 10 is a plan view of a display driver circuit board.

As illustrated in FIG. 9, the source driver 222 according to this embodiment includes input terminals 222A two groups of which, that is, four input terminals 222A in total, receive an input signal. Note that, in FIG. 9, among a plurality of input terminals 222A, shaded input terminals 222A receive an input signal. Meanwhile, as illustrated in FIG. 10, a display driver circuit board 220 includes driver input terminals 223 two groups of which, that is, four driver input terminals 223 in total, are connected to the input terminals 222A to supply the input terminals 222A with an input signal. Note that, in FIG. 10, among a plurality of driver input terminals 223, shaded driver input terminals 223 supply an input signal. This configuration doubles the number of the input terminals 222A compared with that of the first embodiment. Accordingly, the number of input signals to be input per unit time doubles. Such a feature provides twice as much time for processing the input signals by the source driver 222 as that in the first embodiment, which is more beneficial in achieving high definition.

Described next is the distribution of signals to be input into the source driver 222, with reference to FIG. 11. FIG. 11 shows the numbers in the order of the arrangement of the display driver circuit boards 220 so that, in the liquid crystal panel 10 illustrated in FIG. 1, the display driver circuit board 20 positioned on the far left is the first one, and the display driver circuit board 20 positioned on the far right is the twelfth one. FIG. 11 also shows attributes of the input signals in the order of input. The input signals are supplied to the input terminals 222A of the display driver circuit boards 220. As to the attributes of the input signals illustrated in FIG. 11, colors of pixels included in display pixels are indicated with alphabets "R, G, B", and the display pixels are numbered so that a display pixel positioned on the far left of the display area is a 0th display pixel and a display pixel positioned on the far right of the display area is a 7,679th display pixel. Note that, for the sake of the space, FIG. 11 selectively illustrates a part of the input signals to be distributed in the first and the twelfth display driver circuit boards 220.

Figure 11:
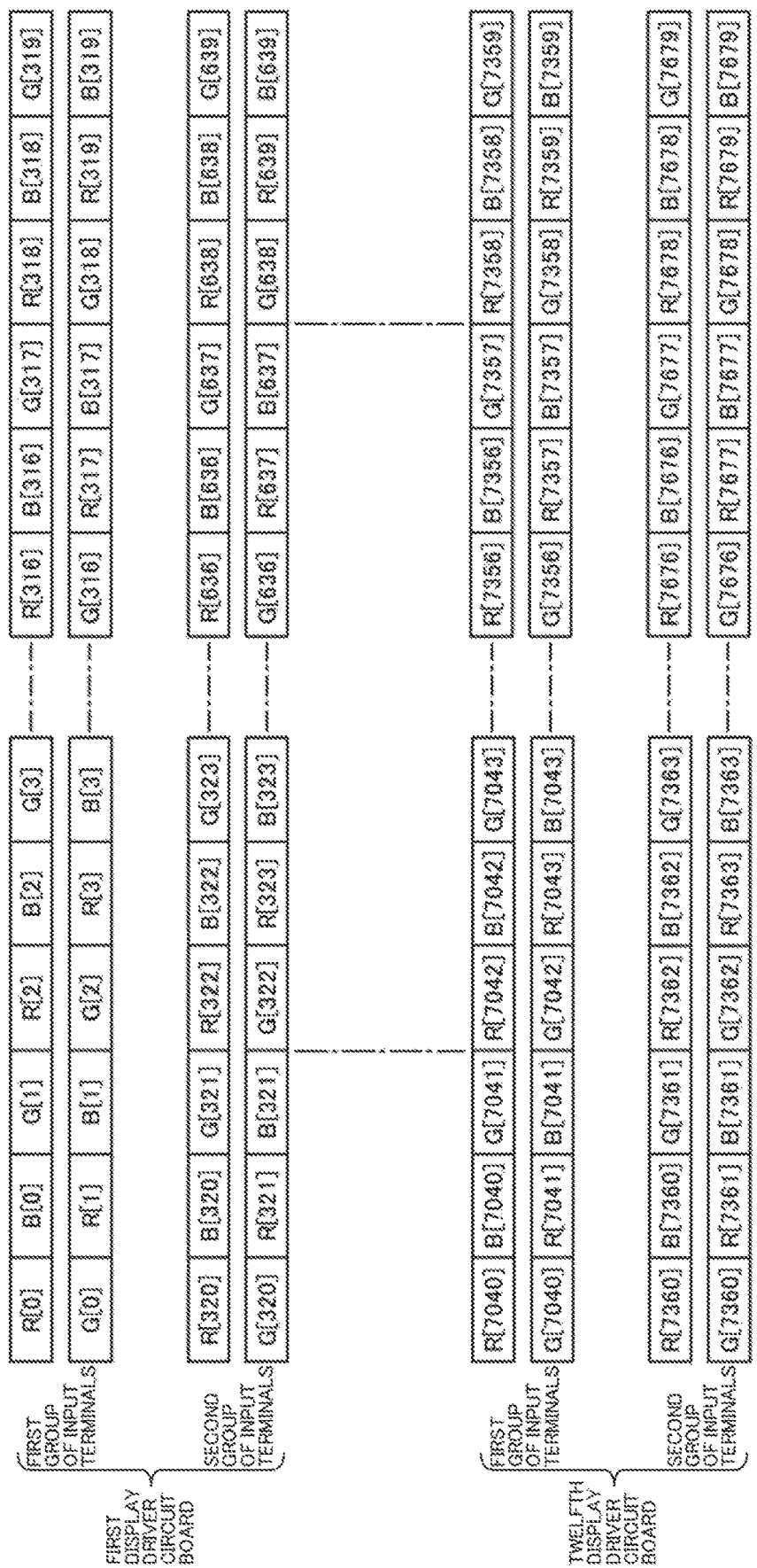
FIG. 11 is a drawing to illustrate how to distribute signals to be input to a source driver.

In this embodiment, as illustrated in FIG. 11, the first display driver circuit board 220 includes a source driver 222 having two groups of input terminals 222A. A first group of input terminals 222A is sequentially supplied with the 0th (R[0]) to the 959th (B[319]) input signals; whereas, a second group of input terminals 222A is sequentially supplied with the 960th (R[320]) to the 1,919th (B[639]) input signals. Accordingly, the second display driver circuit board 220 includes a source driver 222 having two groups of input terminals 222A. A first group of input terminals 222A is sequentially supplied with the 1,920th (R[640]) to the 2,879th (B[959]) input signals; whereas, a second group of input terminals 222A is sequentially supplied with the 2,880th (R[960]) to the 3,839th (B[1,279]) input signals. Accordingly, the twelfth display driver circuit board 220 includes a source driver 222 having two groups of input terminals 222A. A first group of input terminals 222A is sequentially supplied with the 21,120th (R[7,040]) to the 22,079th (B[7,359]) input signals; whereas, a second group of input terminals 222A is sequentially supplied with the 22,080th (R[7,360]) to the 23,039th (B[7,679]) input signals.

In general, where "n" is the number of unit terminals 226A included in terminals 226 and receiving image signals to be output from the source driver 222, "m" is a group number counted from the first group of the groups of the input terminals 222A, and "X" is what number the display driver circuit board 20 is from the far left in FIG. 1, the first group of the input terminals 222A is sequentially supplied with the 2n·(X−1)th to the (n·(2X−1)−1)th input signals; whereas, the m-th group of the input terminals 222A is sequentially supplied with the n·(2X−1)·(m−1)th to the (n·(2Xm−2X−m+2)−1)th input signals. In particular, as to the first display driver circuit board 220, the first group of the input terminals 222A is sequentially supplied with the 0th to the (n−1)th input signals; whereas, the m-th group of the input terminals 222A is sequentially supplied with the n·(m−1)th to the (n·m−1)th input signals. Such features make it possible to process the input signals by the source driver 222 in the same order as that in the case where a display driver circuit board without a no-terminal-formation region 227 is connected to a liquid crystal panel as typically seen. Hence, even though the display driver circuit board 220 has a special configuration including the no-terminal-formation region 227 and two groups of the input terminals 222A, a standard according to transmission of input signals can be maintained as typically is, eliminating the need for introducing a new standard.

As can be seen, according to this embodiment, the source driver 222 includes a plurality of groups of the input terminals 222A receiving input signals, each of the groups including a pair of the input terminals 222A. Compared with a case where only one group of input terminals is provided, the above configuration can increase the number of input signals to be input per unit time. Such a feature makes it possible to maintain as much time to process the input signals by the source driver 222 as typically does.

Furthermore, where "n" is the number of unit terminals 226A included in the terminals 226 and receiving image signals to be output from the source driver 222, and "m" is a group number counted from the first group of the groups of the input terminals 222A, the first group of the input terminal 222A is sequentially supplied with the 0th to the (n−1)th input signals, and the m-th group of the input terminal 222A is sequentially supplied with the n·(m−1)th to the (n·m−1)th input signals. Such a feature allows the source driver 222 to process input signals to be sequentially supplied to the groups of the input terminals 222A, and to output image signals. This source driver 222 processes the input signals in the same order as that in the case where a display driver circuit board without the no-terminal-formation region 227 is connected to a liquid crystal panel as typically seen. Hence, even though the display driver circuit board 220 has a special configuration including the no-terminal-formation region 227 and a plurality of groups of the input terminals 222A, a standard according to transmission of input signals can be maintained as typically is, eliminating the need for introducing a new standard.

Fourth Embodiment

A fourth embodiment will be described, with reference to FIG. 12. This fourth embodiment describes a change from the first embodiment in the number of source drivers 322 included in a display driver circuit board 320. Note that identical or substantially identical structures and advantageous effects between the first embodiment and this embodiment will not be elaborated upon.

Figure 12:
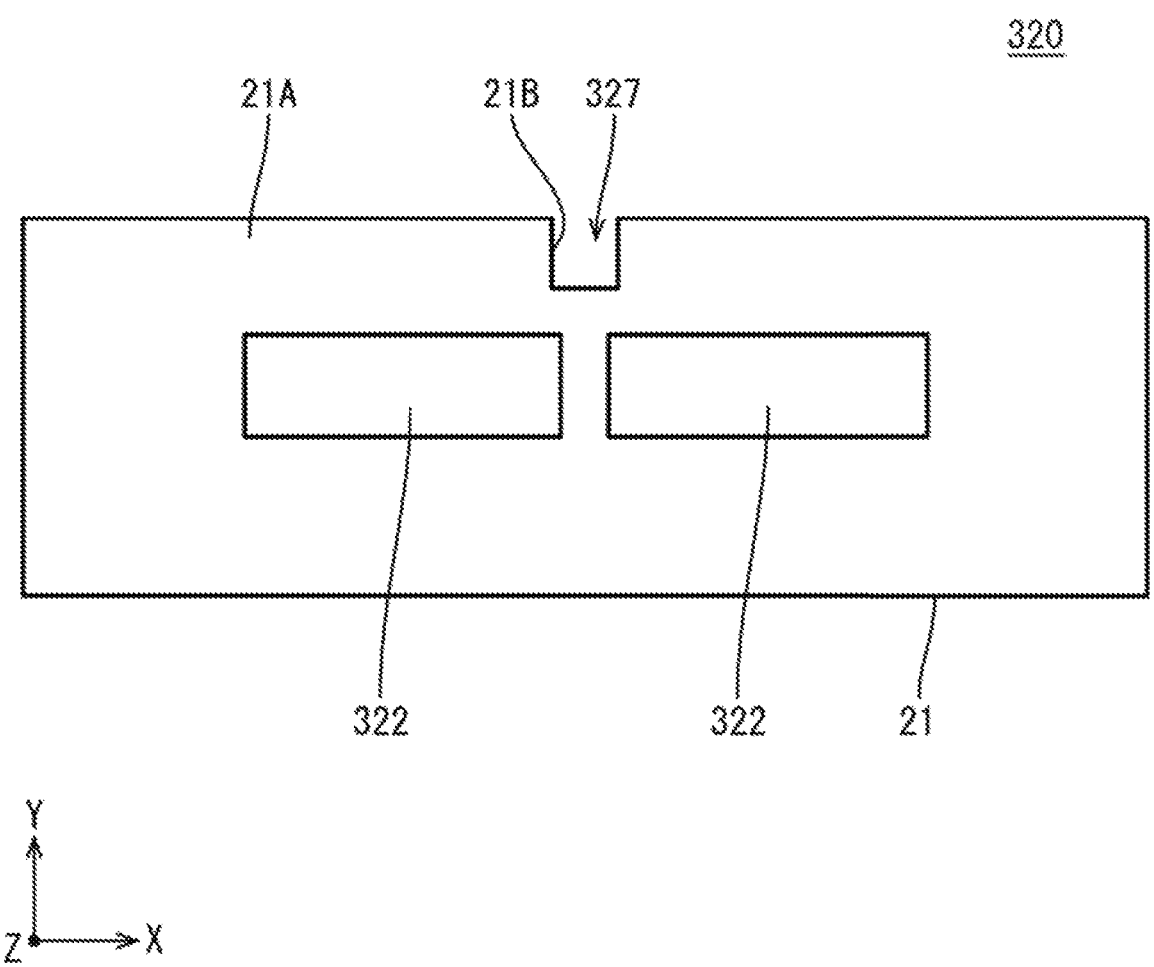
FIG. 12 is a plan view of a display driver circuit board according to a fourth embodiment.

As illustrated in FIG. 12, the display driver circuit board 320 according to this embodiment has two source drivers 322 mounted thereon. The display driver circuit board 320 includes as many source drivers 322 as terminals included in the display driver circuit board 320. Each of the source drivers 322 has "960" output channels the number of which is the same as the number of unit terminals included in one terminal. Hence, one of the two source drivers 322 outputs image signals to be supplied to one of the two terminals, and the other one of the two source drivers 322 outputs image signals to be supplied to the other one of the two terminals. Such a configuration makes it possible to use the same source driver 322 as the one used in the case where 24 display driver circuit boards, each including one source driver having "960" output channels, are connected to a liquid crystal panel as typically seen. This feature eliminates the need for introducing the source drivers 322 as a dedicated component for the display driver circuit board 320 having a special configuration including a no-terminal-formation region 327.

As can be seen, according to this embodiment, as may source drivers 322 as terminals 326 are provided. Such a feature makes it possible to use the same source driver 322 as the one used in the case where a display driver circuit board without the no-terminal-formation region 227 is connected to a liquid crystal panel as typically seen. This feature eliminates the need for introducing the source drivers 322 as a dedicated component for the display driver circuit board 320 having a special configuration including the no-terminal-formation region 327.

Fifth Embodiment

A fifth embodiment will be described, with reference to FIG. 13. This fifth embodiment describes a change from the first embodiment in the configuration of a substrate 421. Note that identical or substantially identical structures and advantageous effects between the first embodiment and this embodiment will not be elaborated upon.

Figure 13:
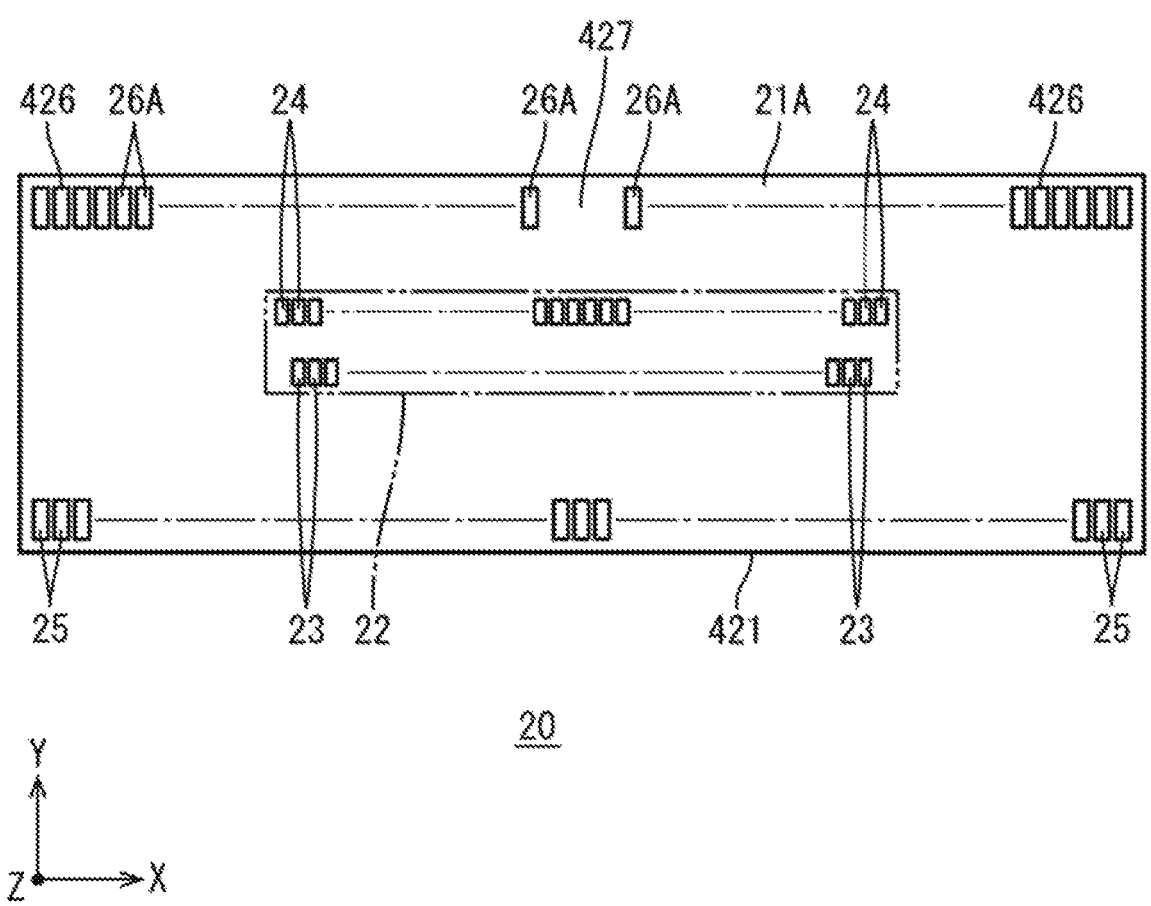
FIG. 13 is a plan view of a display driver circuit board according to a fifth embodiment.

As illustrated in FIG. 13, the substrate 421 according to this embodiment does not include the notch 21B (see FIG. 4) described in the first embodiment. Hence, in this embodiment, the substrate 421 includes a no-terminal-formation region 427 between neighboring terminals 426. Such a configuration can also leave a large space for wiring to be patterned on the substrate 421, beneficially achieving high definition.

Sixth Embodiment

A sixth embodiment will be described, with reference to FIG. 14. This sixth embodiment describes a change from the first embodiment in the configuration of a substrate 521. Note that identical or substantially identical structures and advantageous effects between the first embodiment and this embodiment will not be elaborated upon.

Figure 14:
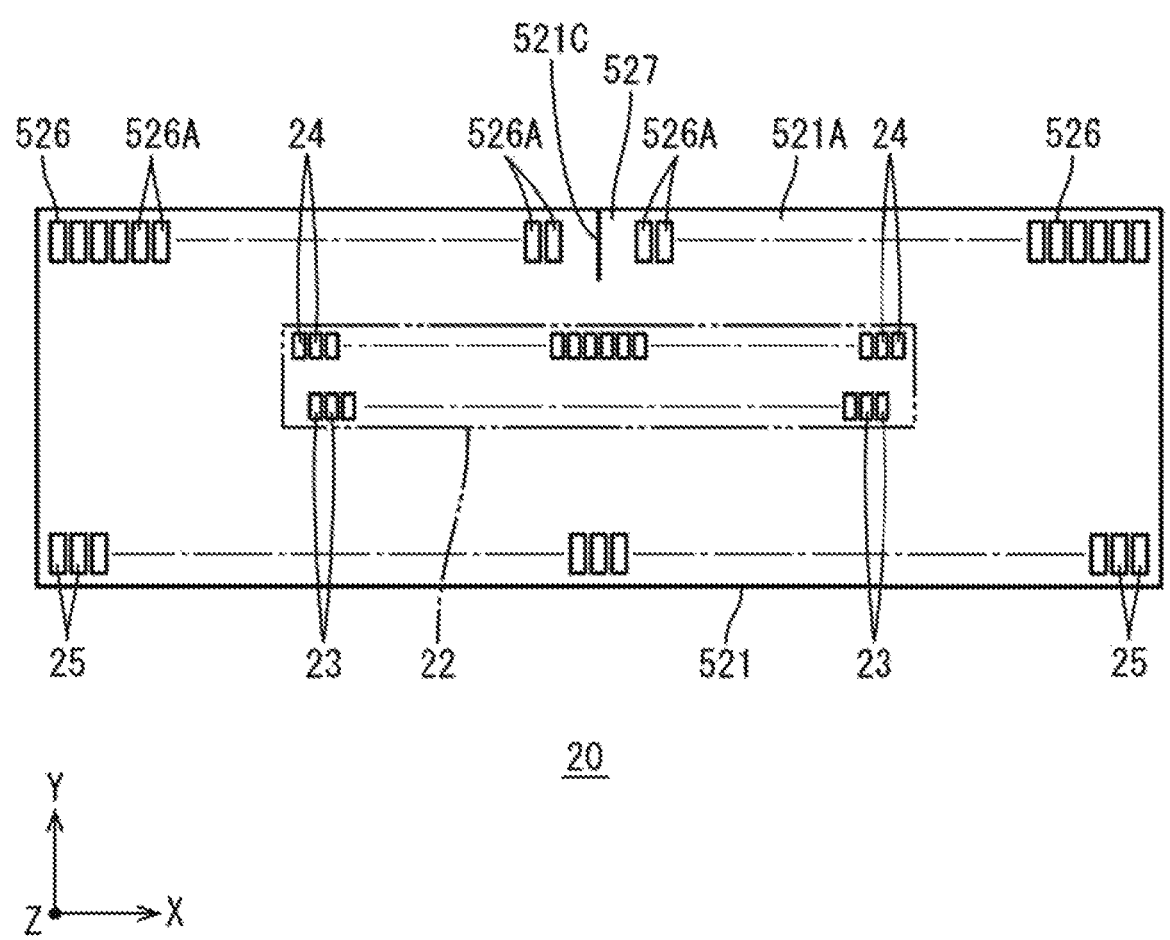
FIG. 14 is a plan view of a display driver circuit board according to a sixth embodiment.

As illustrated in FIG. 14, the substrate 521 according to this embodiment includes a slit 521C instead of the notch 21B (see FIG. 4) described in the first embodiment. The slit 521, linearly extending along the Y-axis, is disposed on a substrate 521 between neighboring terminals 526. This slit 521 divides a join 521A of the substrate 521 for each of the terminals 526. Hence, the substrate 521 has a portion, between the neighboring terminals 526, acting as a no-terminal-formation region 527. The no-terminal-formation region 527 is divided by the slit 521C into a portion including one of the terminals 526 and another portion including another one of the terminal 526. Such a configuration can also leave a large space for wiring to be patterned on the substrate 521, beneficially achieving high definition.

In addition, the configuration makes it possible to reduce misalignment of a unit terminal 526A that might be caused by thermal expansion of the join 521A.

Other Embodiments

The technique disclosed in this Specification shall not be limited to that in the embodiments presented by the above descriptions and the drawings. Alternatively, for example, embodiments below are also included in the scope of the technique.

(1) The substrates 21, 121, 421, and 521 may each include three or more of the terminals 26, 126, 226, 326, 426, and 526. In such a case, the no-terminal-formation regions 27, 127, 227, 327, 427, and 527 are each disposed between the neighboring terminals 26, 126, 226, 326, 426, and 526. The no-terminal-formation regions 27, 127, 227, 327, 427, and 527 are fewer by one than the terminals 26, 126, 226, 326, 426, and 526 of the substrates 21, 121, 421, and 521. Specifically, if three each terminals 26, 126, 226, 326, 426, and 526 are installed on the substrates 21, 121, 421, and 521, two each no-terminal-formation regions 27, 127, 227, 327, 427, and 527 are provided.

(2) Other than the linear arrangement, a specific arrangement of the unit terminals 26A, 126A, 226A, and 526A of the terminals 26, 126, 226, 326, 426, and 526 may include a staggered arrangement. In a similar manner, the input terminals 22A and 222A, and output terminals 22B included in the source drivers 22, 222, and 322, and the driver input terminals 23 and the driver output terminals 24 included in the substrates 21, 121, 421, and 521 may be staggered.

(3) The specific number of the unit terminals 26A, 126A, 226A, and 526A included in the terminals 26, 126, 226, 326, 426, and 526, and supplied with image signals may be changed as appropriate. In such a case, the number of output channels of the source driver 22, 222, and 322 may preferably be changed as appropriate.

(4) The specific number of the input terminals 22A and 222A included in the source drivers 22, 222, and 322 and receiving image signals may be three or more groups, that is, six or more.

(5) Other than (3) and (4), the specific number of the various terminals 22B, 23, 24, and 25 included in the substrates 21, 121, 421, and 521, and in the source drivers 22, 222, and 322 may be changed as appropriate.

(6) Three or more source drivers 22, 222, and 322 may be mounted on the substrates 21, 121, 421, and 521. In such a case, the number of the source drivers 22, 222, and 322 to be mounted may be, but not limited to, the same as that of the terminals 26, 126, 226, 326, 426, and 526 of the substrates 21, 121, 421, and 521.

(7) The specific number and arrangement of the common potential terminals 26A2 and 126A2 in the substrates 21, 121, 421, and 521 may be changed as appropriate.

(8) The specific distribution of the input signals to the source drivers 22, 222, and 322 may be changed as appropriate.

(9) The specific number of the display driver circuit boards 20, 120, 220, and 320 to be connected to the liquid crystal panels 10 and 110 to which the display driver circuit boards 20, 120, 220, and 320 are connected may be changed as appropriate to other than 12.

(10) The specific size and resolution of the liquid crystal panels 10 and 110 to which the display driver circuit boards 20, 120, 220, and 320 are connected may be changed as appropriate.

(11) The liquid crystal panels 10 and 110 to which the display driver circuit boards 20, 120, 220, and 320 are connected may not only be transparent, but also be reflective and translucent.

(12) The planar shape of liquid crystal panels 10 and 110 to which the display driver circuit boards 20, 120, 220, and 320 are connected may include such shapes as a vertically oriented rectangle, a square, a circle, a semi-circle, an oval, an ellipse, and a trapezoid.

(13) The display driver circuit boards 20, 120, 220, and 320 may be connected to other kinds of display panels (e.g., an organic EL panel, an electrophoretic display (EPD), and a micro-electro-mechanical-system (MEMS) display panel) than those of the liquid crystal panels 10 and 110.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A display driver circuit board, comprising:
    a substrate connected to a display panel;
    a display driver mounted on the substrate, and configured to process an input signal and output an image signal; and
    a plurality of terminals, each including a plurality of unit terminals arranged in a joint of the substrate, one of the plurality of unit terminals supplying the image signal to the display panel, wherein:
    the substrate includes:
    the plurality of the terminals arranged at intervals in the joint; and
    a no-terminal-formation region provided between neighboring terminals that prevents the plurality of unit terminals from being formed;
    the display driver includes a plurality of groups of input terminals receiving the input signal, each of the plurality of groups including a pair of the plurality of input terminals;
    "n" is a number of the plurality of unit terminals that receive the image signal to be output from the display driver;
    "m" is a group number counted from a first group of the plurality of groups of the input terminals;
    the first group is sequentially supplied with a 0th to an (n−1) th input signal included in the input signal; and
    an m-th group of the plurality of groups is sequentially supplied with an n·(m−1) th to an (n·m−1) th input signal included in the input signal.

2. The display driver circuit board according to claim 1, wherein the joint is divided for each of the plurality of terminals.

3. The display driver circuit board according to claim 2, wherein the no-terminal-formation region is a notch.

4. The display driver circuit board according to claim 1, wherein:
    each of the plurality of unit terminals includes a common potential terminal supplied with a common potential signal; and
    each common potential terminal is disposed at an end; of the joint, along an arrangement of the plurality of terminals, and in a portion of the joint bordering the no-terminal-formation region.

5. The display driver circuit board according to claim 1 wherein the display driver is disposed across the no-terminal-formation region along an arrangement of the plurality of terminals.

6. The display driver circuit board according to claim 1, further comprising a number of display drivers the number equal to a number of the plurality of terminals.

7. A display device, comprising:
    the display driver circuit board according to claim 1; and
    the display panel to which the display driver circuit board is connected.

* * * * *